United States Patent [19]

Dickhut et al.

[11] Patent Number: 4,486,929
[45] Date of Patent: Dec. 11, 1984

[54] TILE PERFORATING UNIT

[75] Inventors: Heinrich Dickhut, Chebanse; Alfred Lilienthal, Bourbonnais, both of Ill.

[73] Assignee: Cullom Machine Tool & Die, Inc., Cullom, Ill.

[21] Appl. No.: 299,228

[22] Filed: Sep. 4, 1981

[51] Int. Cl.³ .................. B23Q 5/22; B26D 3/06; B29C 17/10
[52] U.S. Cl. ...................... 29/33 T; 83/54; 83/308; 83/314; 83/318
[58] Field of Search ............ 83/30, 54, 308, 318, 83/319, 320, 314, 660, 338, 490, 39, 210, 282, 326, 327, 485, 487; 29/33 T, 564.7, 33 A

[56] References Cited

U.S. PATENT DOCUMENTS

| | | | |
|---|---|---|---|
| 1,751,451 | 3/1930 | Smith | 83/318 |
| 2,329,020 | 9/1943 | Wales | 83/54 |
| 2,741,309 | 4/1956 | Czarnik | 83/319 X |
| 3,160,687 | 12/1964 | Andrews | |
| 3,400,426 | 9/1968 | Boggs | 83/319 X |
| 3,562,377 | 2/1971 | Zetzsche | |
| 3,719,736 | 3/1973 | Woodruff | |
| 3,901,113 | 8/1975 | Oltmanns et al. | 83/54 X |
| 3,910,713 | 10/1975 | Maroschak | 83/54 X |
| 3,957,386 | 5/1976 | Lupke | |
| 4,112,810 | 9/1978 | Dreibelbis | 83/54 X |
| 4,180,357 | 12/1979 | Lupke et al. | |
| 4,218,164 | 8/1980 | Lupke et al. | |

Primary Examiner—William R. Briggs
Attorney, Agent, or Firm—Wood, Dalton, Phillips, Mason & Rowe

[57] ABSTRACT

A tile perforating unit wherein tile is continuously advanced through a frame by advancing means. Moveably mounted on the frame and directed toward the tile is at least one perforating tool. From an initial position, the tool extends and engages a point along the wall of the tile at which perforation is desired. As the tool moves to maintain engagement with the advancing tile a harpoon is extended from the tool to perforate the tile wall. Once perforation is completed, the harpon is withdrawn and the tool retracts and returns to the initial position for repeated perforation of the tile.

13 Claims, 7 Drawing Figures

TILE PERFORATING UNIT

BACKGROUND OF THE INVENTION

1. Field of the Invention

This invention relates to devices which perforate conduits and more particularly it relates to devices which are capable of perforating a moving or advancing conduit.

2. Description of the Prior Art

In certain applications such as the drainage of water, it has been found advantageous to perforate the drainage tile along at least a portion of its length. The perforations allow the water to enter the tile, collect and eventually flow out of the end of the tile for ultimate disposal. To enable the water to freely flow, it is desirable to collect the water without causing sand, soil and the like to also enter into the interior of the tile.

One particular type of perforated tile specially adapted for the aforementioned collection and drainage of water, is described in U.S. Pat. No. 3,699,684 issued Oct. 24, 1972 and U.S. Pat. No. 3,830,373 issued Aug. 20, 1974 both to Marty E. Sixt. The plastic tile is corrugated, having alternating grooves and lands, and having openings selectively formed in the grooves to admit water into the tile. A screen is wrapped around the tile supported by the lands to prevent foreign materials, such as soil, from entering the tile.

To form the desired water admitting perforation in corrugated plastic drainage tiles and the like, various types of tools have been devised. One such device is shown in the Andrews U.S. Pat. No. 3,160,687 issued Dec. 8, 1964. The tile is drawn through the device wherein a rotating perforating roll, having a plurality of pins, punctures a wall of the tile. While this device does provide a means to perforate an advancing tile, such perforations are formed in only the one side of the tile which is engaged by the roll. No means are provided to easily adjust the size of the perforations created in the tile, and no means are provided to assure that, should corrugated tile be desired, only the grooves receive the perforation. Further, this type of device cannot be easily adapted to handle tiles of different diameters.

Another known type of device for perforating a tile is shown in the Zetzche U.S. Pat. No. 3,562,377 issued Feb. 9, 1971. The plastic tile partially wraps around and is advanced by the rotation of a sheave. Mounted on the sheave are orifice forming tools which advance and puncture the tile, pivot in a circulating motion creating circular bosses, and retract all in response to sheave rotation. This type of perforating device also encounters the same drawbacks discussed above.

Mechanical cutting of slits by rotary moving blades is known from U.S. Pat. No. 4,180,357.

It is the object of the present invention to set forth a tile perforating unit wherein the drawbacks outlined above are overcome.

SUMMARY OF THE INVENTION

Accordingly, a tile perforating unit is provided which can, in one pass, perforate all sides of continuously advancing tiles of different diameters. The perforations are formed in such a manner that water can be drained without admitting particulates into the tile thereby dispensing with the need to wrap the tile with screening material. For corrugated tiles, the perforating unit selectively forms the perforations in only the grooves thereof.

Toward this end a tile perforating unit is set forth having at least one extendable perforating tool mounted on a frame and movable to follow the advancement of the tile. As a tile is continuously advanced past the frame, the perforating tools are driven in unison to extend toward the tile. A guide on the end of the perforating tool locates and enters the grooves of corrugated tiles whereupon the perforating unit moves to follow the travel of the tile, and drives a harpoon through the wall of the tile forming the desired perforation. Thereafter the perforating tool retracts and returns to its original position on the frame. The foregoing is repeated to achieve the desired number of perforations on the tile.

The perforating unit, in the above described fashion, can, in one pass of the tile, form as many perforations as is desired, selectively perforate the grooves of corrugated tile, and through the interchange of harpoons, form perforations of a size which, depending on soil composition, will admit only water into the drainage tile for collection and disposal thereof. Tiles of different diameter can be perforated with slight adjustments in the machinery to accommodate a different position for the travel of the harpoons in meeting the tile wall and performing the perforating task.

Further objects and advantages of the present invention will become apparent from the specification, the claims and the attached drawings.

DESCRIPTION

Figure 1:
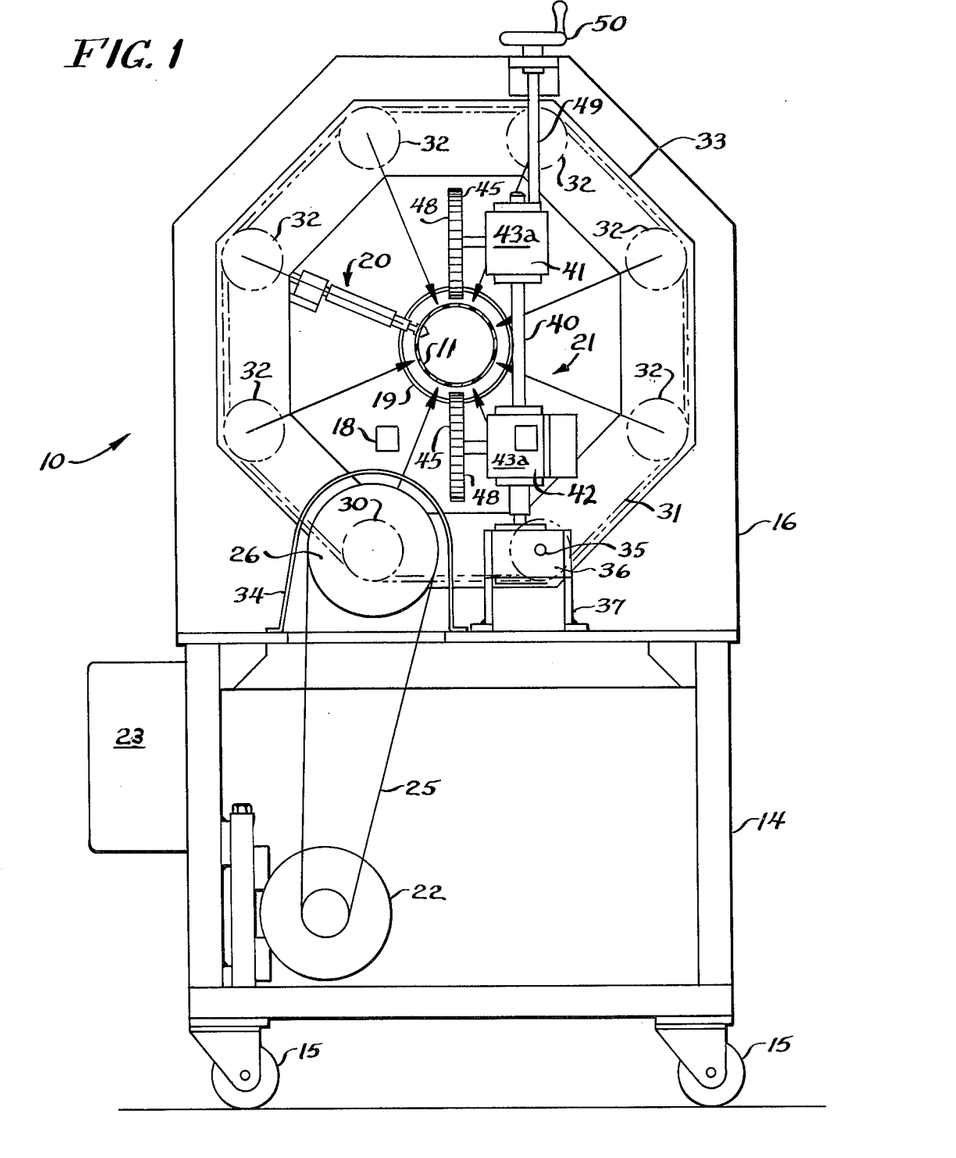
FIG. 1 is a front elevation view of the tile perforating unit.
Figure 2:
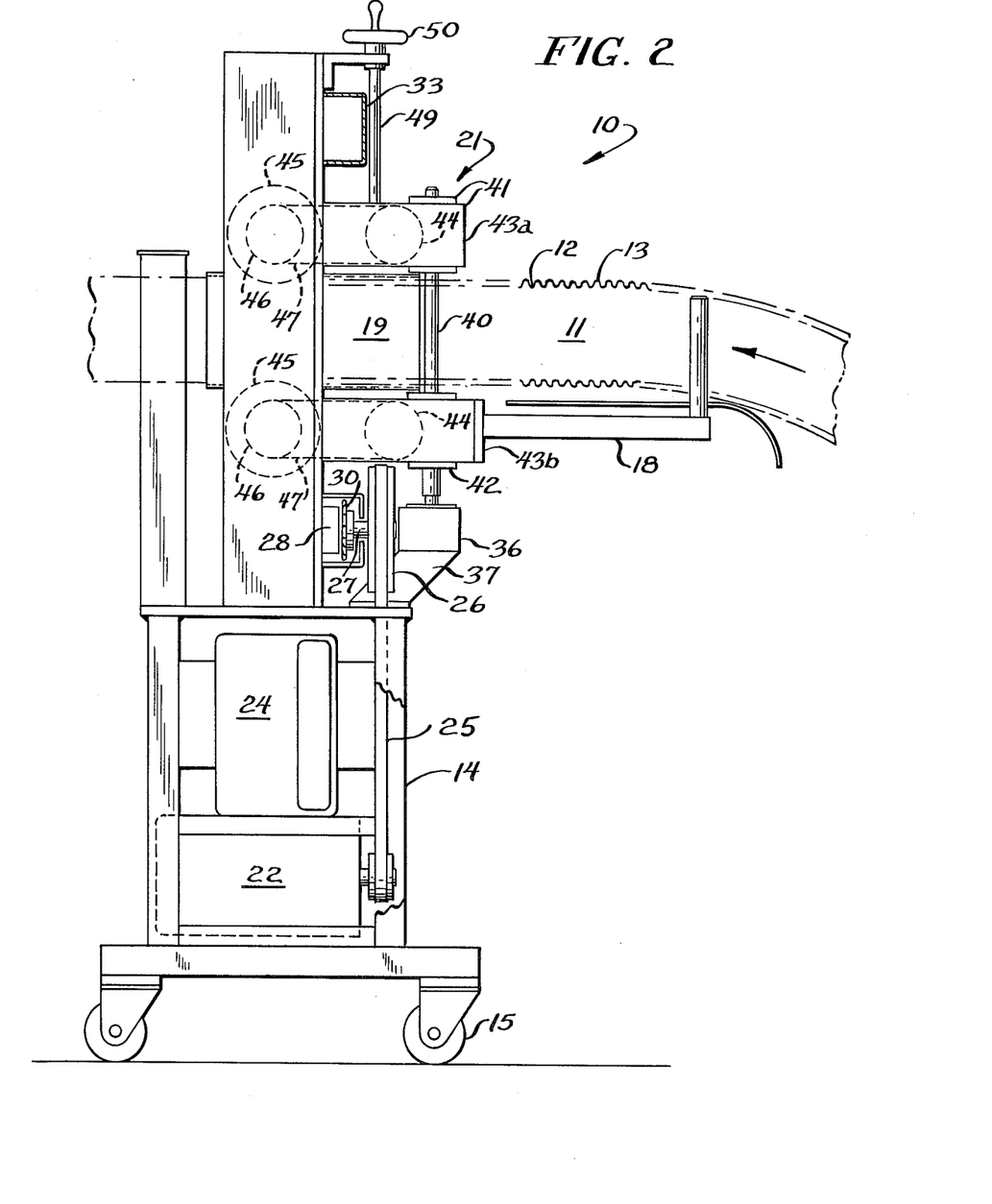
FIG. 2 is a side elevation view of the tile perforating unit illustrating the advancement of the tile through said unit.

Turning now to FIGS. 1 and 2 an overall view of the tile perforating unit 10 is shown. Typically, the perforating unit 10 would be found in a factory setting wherein plastic drainage tiles, such as a corrugated tile 11 with alternating grooves 12 and lands 13, manufactured elsewhere are brought to the unit 10 for perforation thereof. The tiles 11, in a manner described in detail below, are passed through the perforating unit 10 wherein the perforations necessary for drainage are formed in the tile 11.

Accordingly, the perforating unit 10 has a base 14 which can be movably mounted on casters 15 if desired. The base 14 provides support for an electric motor 22 and its mount 24 and motor control 23. The base 14 also provides support for the frame 16 upstanding therefrom.

As seen in FIGS. 1 and 2 the tile 11 is advanced through the frame 16 wherein the perforation of the tile 11 is accomplished. To provide a means to guide the advancement of the tile 11 toward and through the frame 16, the frame 16 supports a frontally extending, lipped table 18 which directs the incoming tile 11 toward the center of the frame 16. A sleeve 19, mounted at and extending through the center of the frame 16, supports and guides the tile 11 as it passes therethrough. In addition to supporting the tile 11 guiding means, the frame 16 supports a number of perforators 20, for purposes of illustration shown as being eight in number, and an advance means both of which will be subsequently described in detail. As best seen in FIG. 2, the tile 11 is advanced toward the frame 14 over the table 18 and through the sleeve 19 for perforation of the tile 11.

To provide a means to simultaneously drive the perforators 20 and the tile advancing means, the electric motor 22 controlled by the motor control 23 drives a belt 25 which, in turn rotates a sheave 26 whose shaft 27 is rotatably supported by a bearing set 28 mounted to the frame 16. A drive sprocket 30, interposed between the bearing set 28 and the sheave 26, is keyed to the shaft 27 for rotation therewith. The drive sprocket 30 meshes with and drives an endless chain 31 which, in turn, meshes with and simultaneously drives a plurality of sprockets 32 similarly rotatably supported by the frame 16, each sprocket 32 and the drive sprocket 30 being associated with and, in a manner described in detail below, providing motive power to a perforator 20. For protection of the operator of the perforating unit 10, the chain 31 and sprockets 30 and 32, are housed within a protective shroud defining a chain guard 33 and a belt guard 34 surrounds the sheave 26.

The aforementioned advancing means, shown as an advance mechanism 21, is required to be adjustable in order that it may advance tiles of different diameters through the perforating unit 10 and more particularly the frame 16 thereof. Accordingly, the adjustable advance mechanism 21 consists of a sprocket 32 rotated shaft 35 communicating with a speed reducer 36 supported above the base 14 by brackets 37. The speed reducer 36 reduces the rotative speed of the shaft 35 to a speed usuable to advance the tile 11. From the reducer 36 an intermediate shaft 40 extends vertically to transmit rotating motion to a first and a second gear box 41 and 42. Each of the first and second gearboxes 41 and 42 is supported, respectively, by a first and a second subframe 43a and 43b which extend horizontally into the frame 16 spanning the sleeve 19. The first and second gearboxes 41 and 42 transform the vertically orientated rotation of the intermediate shaft 40 into rotation of a pair advance drive sprockets 44 about horizontal axes. At the end of each subframe 43a and 43b opposing the first and second gearboxes 41 and 42 are advance wheels 45. Each of the advance wheels 45 is rotatably supported by the subframes 43a and 43b and has associated therewith an advance sprocket 46. The advance sprockets 46 are rotated by the advance drive sprockets 44 with an advance chain 47 so that each of the advance wheels 45 will rotate in the direction of and drive the advancement of the tile 11 through the frame 16 and more particularly the sleeve 19.

During operation of the unit 10 the advance wheels 45 are in contact with the top and bottom of the tile 11 and rotate in a direction, to trap and advance the tile 11 toward and through the sleeve 19. For corrugated tile as shown in the drawings, the advance wheels 45 have peripheral teeth 48 which are accepted by the grooves 12 of the corrugated tile 11. As seen in FIG. 2 the advance wheels 48 extend inside of the sleeve 19 thereby requiring that the sleeve 19 have appropriate openings (not shown) to accommodate each of the advance wheels 45.

To enable the unit 10 to advance and perforate tiles of different diameters, the advance mechanism 21 has a screw shaft 49 which is received at one end by and supports the first subframe 43a and has at the other end a rotatable handle 50. Rotation of the handle 50 turns the screw shaft 49 resulting in the movement of the first subframe 43a and its advance wheel 45, either toward or away from the stationary second subframe 43b and its advance wheel 45. This in turn enables various sizes of tiles to be accepted and advanced by the advance mechanism 21 by adjustment of the gap between the advance wheels 45. Each size tile is advanced through a mating size of sleeve 19.

To accommodate the above adjustment of the first subframe 43a, the intermediate shaft 40 and first gearbox 41 must be appropriately fashioned, as by splining the intermediate shaft 40, such that rotation may be transmitted to first gearbox 41 adjusted to various positions therealong.

Figure 3:
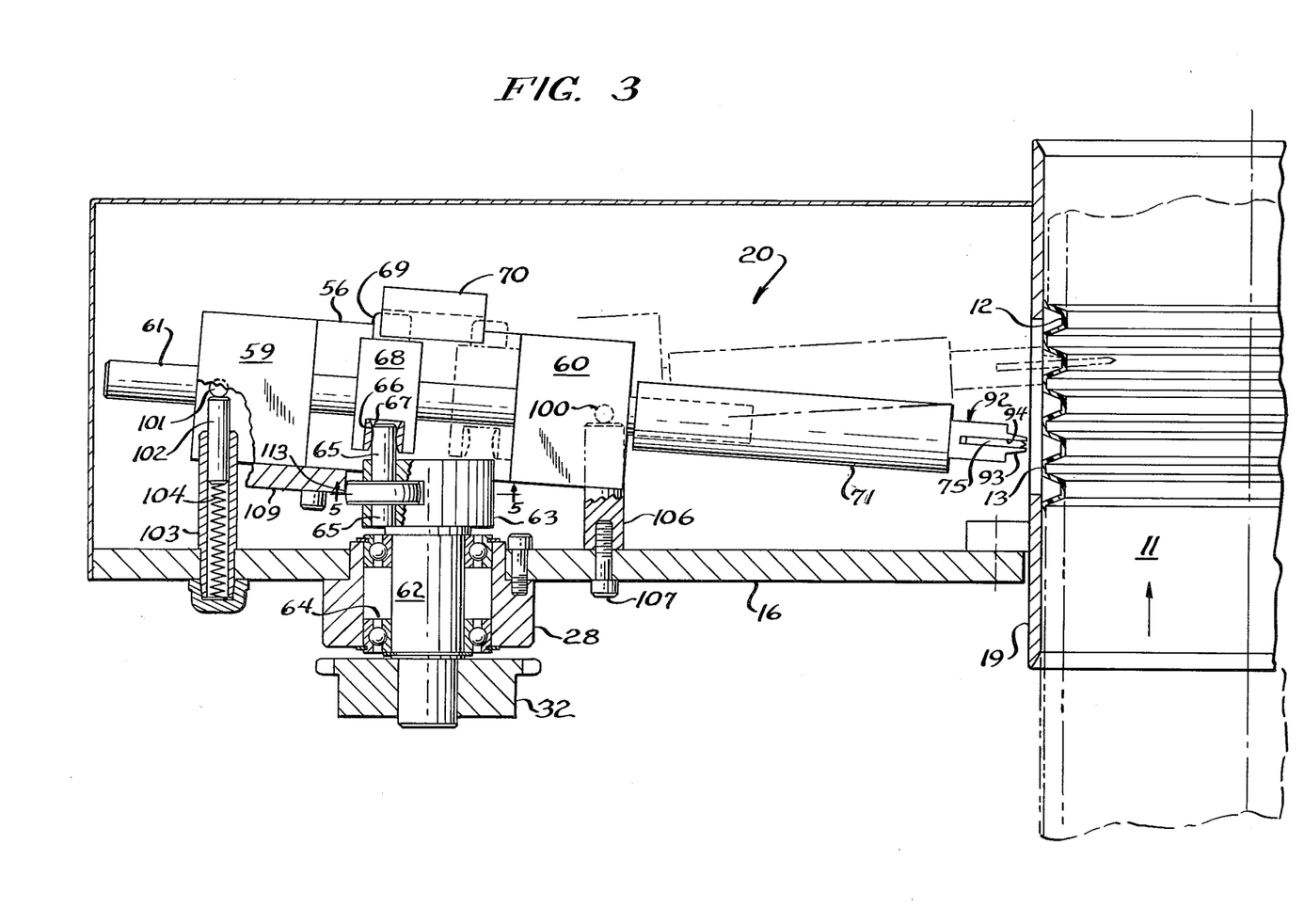
FIG. 3 is a fragmentary plan view of a perforator illustrating pivoting, by broken lines, during the perforation operation.
Figures 4, 5:
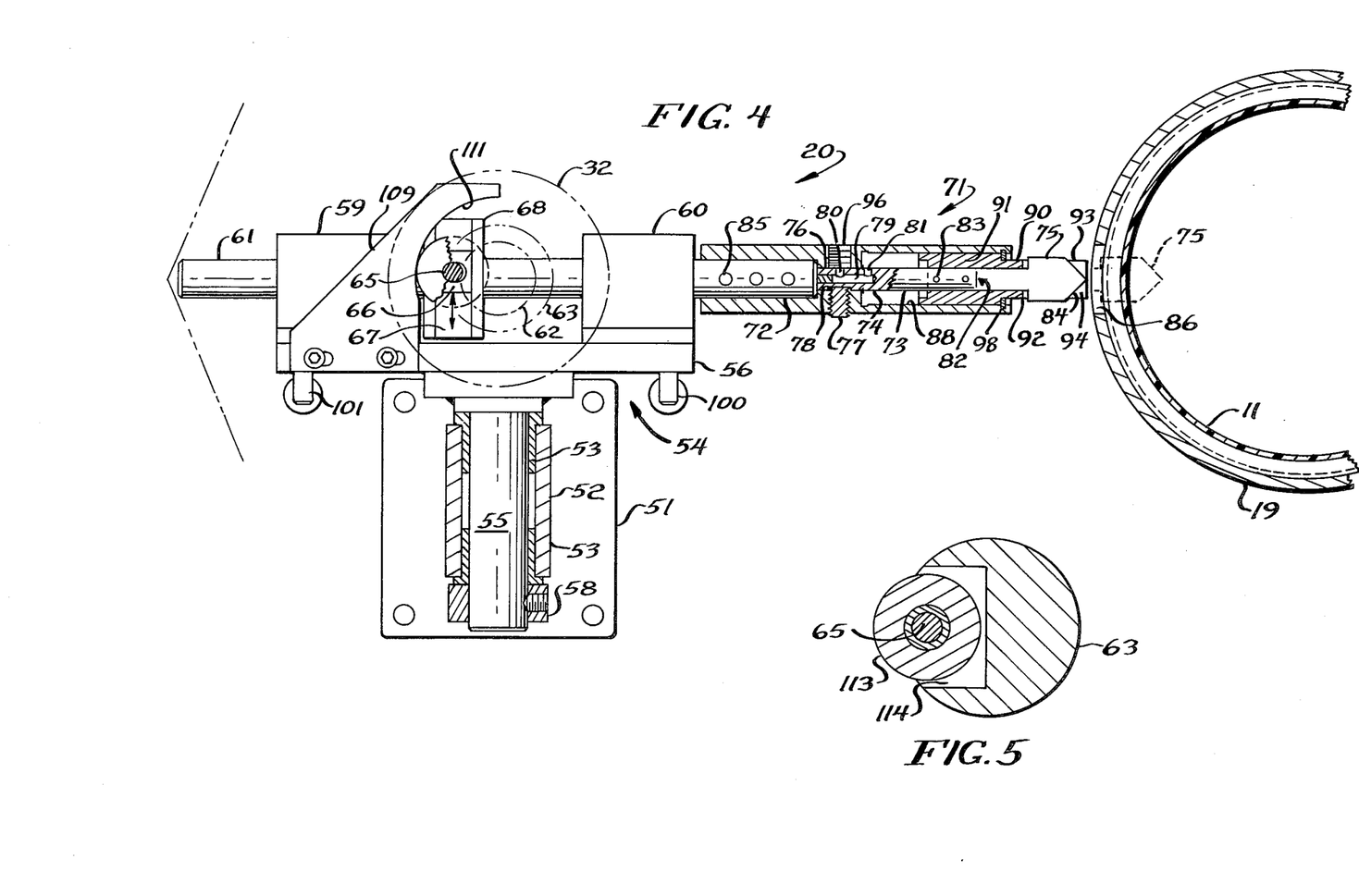
FIG. 4 is a fragmentary side elevation view of the perforator illustrated in FIG. 3 with portions thereof broken away to illustrate operations.
FIG. 5 is a fragmentary sectional view of a portion of the perforator using a rolling cam taken substantially along line 5—5 in FIG. 3.

Turning to FIGS. 3–5 an embodiment of the perforator 20 is shown in more detail. Since all perforators 20 are substantially identical and interchangeable, only one will be described in detail. The perforator 20 has associated therewith a mount 51 which is affixed to the frame 16. As part of the mount 51 is a cylindrical brace 52 housing a pair of bushings 53 within which the perforator 20 is pivotally mounted.

Pivotally received by the brace 52 is a support 54 consisting of a cylindrical stem 55, which is closely received by and pivots within the bushings 53, and a rectangular platform 56. A removable retaining flange 58 on the end of the stem 55 holds the stem 55 within the brace 52. The mount 51, brace 52, stem 55 and platform 56 are arranged such that the platform 56 pivots to permit the end of the perforator 20 to move in the direction of the tile 11 travel and then reverse to its starting position.

Rear and forward pillow blocks 59 and 60 are secured to the platform 56. Slidably passing through the rear and forward pillow blocks 59 and 60 is a rod 61 which, due to the orientation of the platform 56, orients the rod axis so as to be radially directed toward the tile 11. The rod 61 is the driven element of the perforator 20. Motion is imparted to the rod 61 from the chain driven sprocket 32 or, for the perforator 20 adjoining the sheave 26 from the drive sprocket 30 itself, through a rotor shaft 62 which supports a rotor head 63. The bearing set 28 mounted on the frame 16 has a pair of bearings 64 which supports the rotor shaft 62 and the attached sprocket 32 for rotation thereof. An off-center pin 65 supported by the rotor head 63 extends outwardly therefrom to engage a shoe 66 slidable up and down in an upright slot 67 disposed in a shoe block 68 secured to the rod 61 between the rear and forward pillow blocks 59 and 60.

From the above, rotation of the sprocket 32 results in the rotation of the rotor head 63, which, through the pin 65 and slidable shoe 66, is translated into reciprocating drive of the shoe block 68 and the connected rod 61 toward and away from the tile 11. To provide for the pivoting of the perforator 20 during the drive of the rod 61, the shoe 66 has arcuate walls to bear against the pin 65. In order to prevent the rod 61 and shoe block 68 from turning about their axis during reciprocation thereof, the shoe block 68 has, opposing the slot 67, a universal bearing 69 received by a slotted block 70 which is affixed to platform 56.

The tile 11 is perforated by a harpoon mechanism 71 carried on the inner end, or the end nearest the tile 11, of the reciprocating rod 61 as shown in FIG. 4. The mechanism 71 has a rearwardly opening bore 72 to receive the end of the rod 61 in a plurality of positions, as determined by the size of the tile, by selectively securing appropriate fasteners (not shown) in the plurality of receptacles 85 provided in the rod 61 and mechanism 71 for that purpose.

Removably held within the mechanism 71 is a harpoon 73 consisting of a harpoon shaft 74 and harpoon head 75. The harpoon shaft 74 is received by a center bore 76 in the mechanism 71 and extends forward toward the tile 11. The harpoon shaft 74 is secured within the center bore 76 by a threaded plug 77 which extends radially into the mechanism 71 and is received by a slot 78 formed in the harpoon shaft 74. Fashioned in the end of the harpoon shaft 74 lying within the center bore 76 is a plugged axial port 79 interconnecting radial first and second ports 80 and 81 the purposes of which will subsequently be described in detail.

At the forwardmost end of the harpoon shaft 74, the flat metallic harpoon head 75 is removably positioned within a diametrical slot 82 by a plurality of fasteners 83 which for proper operation of the machine must not protrude from the harpoon shaft 71. The harpoon head 75 extends forward from the slot 82, outward from the harpoon mechanism 71, and has a pointed cutting edge 84. During operation of the perforator 20, the reciprocating motion of the rod 61 is transmitted through the mechanism 71 to the harpoon 73 whereupon the cutting edge 84 is driven forward to perforate the tile 11 and thereafter is retracted. The sleeve 19, in order to accommodate the perforation of the tile 11 advancing therethrough must have appropriate longitudinal openings 86 to pass, and as described below, permit the pivoting of the harpoon mechanism 71.

In order to enable the perforator 20 to selectively perforate only in the grooves 12 of the tile 11, the harpoon mechanism 71 has a cylinder bore 88 housing a slidable, harpoon head 75 enveloping, guide 90. As seen in FIGS. 3 and 4, the guide 90 has a piston part 91, slidable along the harpoon shaft 74, disposed within the cylinder bore 88. Coaxially extending from the piston part 91, toward the tile 11, is smaller diameter sheath 92. The sheath 92 is for the most part cylindrical having on its end an angular finger 93 adapted to be received by the grooves 12 of the tile 11. A vertical cutout 94 in the sheath 92 houses the harpoon head 75 and its cutting edge 84.

Acting as a means to bias the guide 90 to a forward, harpoon 73 enveloping position, the harpoon mechanism 71 has a medial, threaded fitting bore 96 which, through a fitting (not shown), admits compressed air into the aforementioned first port 80. From the first port 80 the compressed air, at for example 5 psig, communicates, through the axial port 79 and the second port 81, with the cylinder bore 88 to act against the piston part 91 and forwardly bias the guide 90 to the harpoon 73 enveloping position shown in FIG. 4. A removable retaining ring 98 disposed within the cylinder bore 88 at the forward end thereof maintains the piston part 91 of guide 90 within the cylinder bore 88.

When the rod 61 is driven toward the tile 11, the harpoon mechanism 71 including the guide 90 moves unitarily until the finger 93 engages the tile 11. Should the finger 93 engage a land 13 of the tile 11, the rapid advancement of the tile 11 will cause the finger 93 to slide from the land 13 and extend into the succeeding groove 12. Continued extension of the harpoon mechanism 71 for perforation of the tile 11 results in the retraction of the guide 90, against its bias, into the cylinder bore 88 uncovering the harpoon head 75 as it extends through and perforates the wall of the tile 11. The guide 90, biased by the compressed air, resumes its outermost position as the harpoon head 75 is withdrawn and harpoon mechanism 71 is retracted from the tile 11 in readiness for repeated perforation of the grooves 12 of the tile 11.

It has been found that properly sized perforations, for example 0.010 inches wide, disposed in the above fashion within the grooves 12 of the tile 11, enables the tile 11 when buried to drain water without admitting surrounding particulates such as soil. Depending upon the soil composition, the perforations may be made larger by proper selection of the harpoon head 75 taking into account the tendency of the elastic wall of the tile 11 to partially close when the harpoon head 75 is withdrawn therefrom and any preheating of tile 11 which tends to reduce the amount of elastic closure of the perforation by the tile 11 wall.

For example, to form a perforation 0.010 inches wide in the wall of the tile 11, a harpoon head 75 of 0.030 inches wide is selected. The plug 77 is removed from the harpoon mechanism 71 freeing the harpoon 73 for removal therefrom whereupon the proper harpoon head 75 is inserted into the slot 82 and secured by the fasteners 83. The harpoon 73 is reinserted into the harpoon mechanism 71 and fastened therein by the plug 77. Upon perforation of the tile 11, the initial perforation formed by the harpoon head 75 of 0.030 inches, reduces to an opening of approximately 0.010 inches as the wall of the tile 11 elastically closes. For larger openings a larger harpoon head 75 may be selected or the tile 11 may be heated reducing the amount of elastic closure of the perforation.

Since the tile 11 is continuously advancing through the frame 16, the sustained engagement of the traveling tile 11 by the harpoon mechanism 71 during the above described perforation thereof, is accompanied by movement, particularly of the guide 90 and harpoon head 75, to follow the tile 11 without impeding the tile movement. One satisfactory means by which such non-impeding movement may occur to follow the tile 11 is by the pivoting of the entire perforator 20 as illustrated by the solid and phantom lines in FIG. 3. This pivoting of the perforator 20 is attended to by the support 54 which, by its stem 55, is pivotally mounted to the frame 16. To maintain the pivoting within limits, as defined by tile 11 speed and duration of contact of the tile 11 by the perforator 20, and to return the perforator 20 to an initial cocked position (shown by solid lines in FIG. 3) a first stop 100 is disposed beneath the platform 56 near the harpoon mechanism 71. A similarly disposed second stop 101 is affixed to the platform 56 at the opposite end thereof. Abutting the second stop 101 is a nose 102 biased outward from a cylindrical spring support 103 by a spring 104. In the cocked position the outward bias of the spring 104 directed against the second stop 101 holds the first stop 100 in engagement with a stud 106 affixed to the frame 16 by a bolt 107. As the harpoon mechanism 71 of the perforator 20 is extended and the finger 93 engages a groove 12 of the moving tile 11, the perforator 20, pivots to follow said tile 11 motion against the bias of the spring 104. Once the perforation of the tile 11 is accomplished and the harpoon mechanism 71 is withdrawn from the tile 11, the bias of the spring 104 against the second stop 101 results in the reverse pivoting of the perforator 20 back to the cocked position where the first stop 101 re-engages the stud 106.

To accommodate high speed advancement and perforation of the tile 11 on the order of 35 feet per minute, means acting in conjunction with the spring 104 are necessary to positively force the perforator 20 to return to its cocked position. For this purpose an upstanding, flat follower 109 having an arcuate face 111 is disposed on the platform 56 of the perforator 20 adjacent to the rotor head 63. When the perforator 20 is in the cocked position a cam 113, rollably supported in a notch 114 in the rotor head 63 by the pin 65 as seen in FIG. 5, protrudes from the rotor head 63 to engage and follow the face 111. In so doing the cam 113 creates a moment upon the platform 56 holding the first stop 100 against the stud 106. During perforation of the tile 11, the rotor head 63 rotates, as seen in FIG. 4, in a clockwise direction disengaging the cam 102 from the face 111 enabling the perforator 20 to pivot in the manner described above as the tile 11 is perforated. As the rotor head 63 continues to rotate the drive of the rod 61 by the pin 65 causes the harpoon mechanism 71 to withdraw from the tile 11 whereupon the spring 104 biases the perforator 20 to reverse pivot and return to the cocked position. At some point during the spring 104 induced reverse pivoting of the perforator 20, shown in FIG. 4 as being the point at which the cam 113 has rotated to approximately the nine o'clock position, the cam 113 re-engages the face 111 of the follower 109. In so doing, should the perforator 20 not have completely returned to the cocked position, the cam 113 rolls along and exerts a force upon the face 111 thereby creating a moment upon the perforator 20 forcibly returning it to the cocked position.

Figures 6, 7:
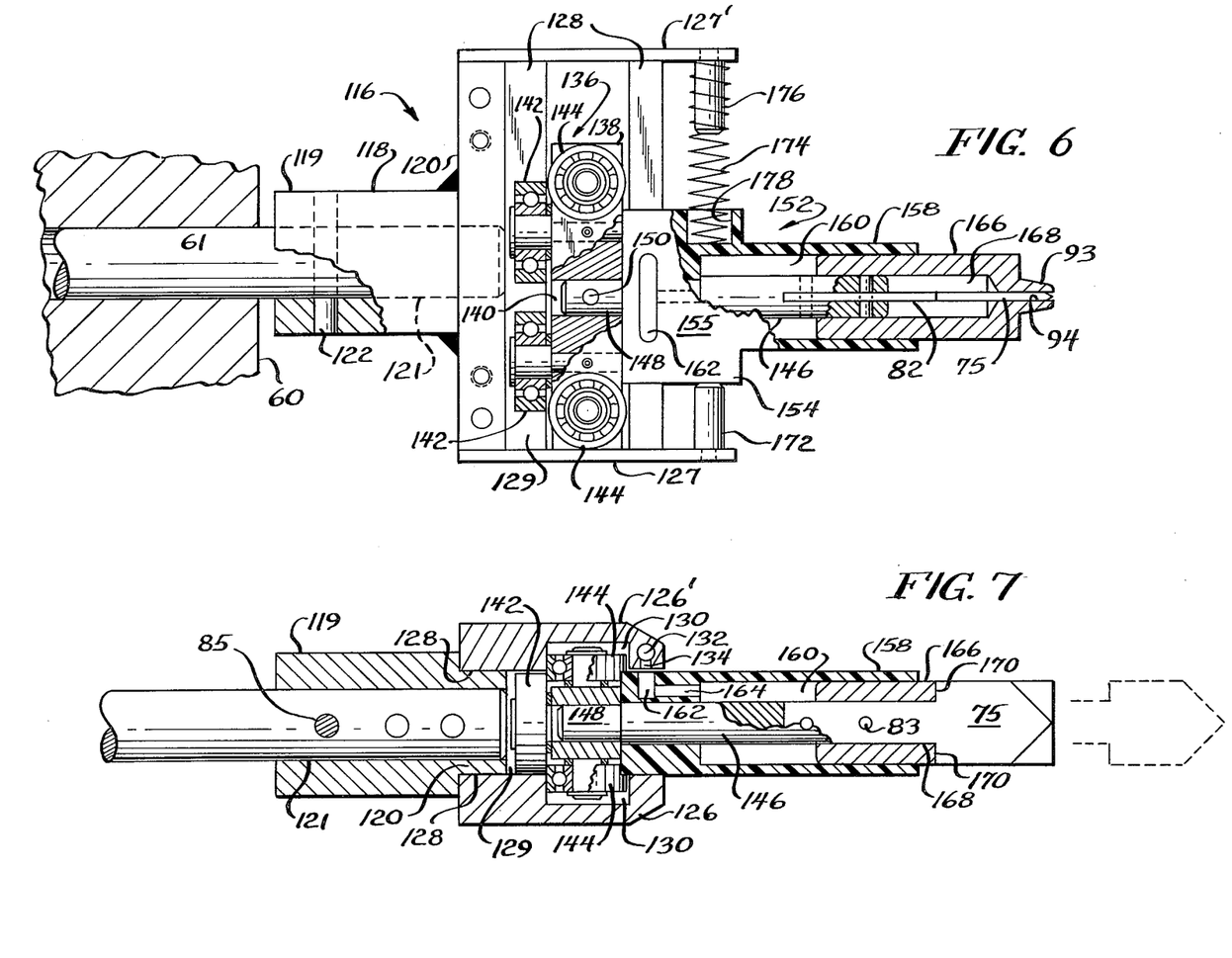
FIG. 6 is a fragmentary top view of the perforator illustrating another embodiment thereof.
FIG. 7 is a fragmentary section view of the perforator of FIG. 6.

Turning to FIGS. 6 and 7 another embodiment of the perforator 20 is illustrated. Elements having the same reference numeral are similar to those previously described.

The perforator 20 of this embodiment has its platform 56 immovably secured to the frame 16, as, for example, by pinning the stem 55 against rotation within the brace 52 of the mount 51 (see FIG. 4). The immovable mounting of the platform 56 results in the elimination or modification of several elements of the perforator 20 described above. In particular, turning to FIG. 3, the spring 104, spring support 103, nose 102 and the second stop 101 associated therewith are not required for this embodiment of the perforator 20. Likewise, the stud 106 and first stop 100 can also be eliminated. Lastly, those elements associated with the pivoting drive of the perforator 20, in particular the cam 113 and follower 109 can be eliminated and the arcuate walls of the shoe 66 can be replaced by smooth walls which closely receive the pin 65.

Returning to FIGS. 6 and 7, attached to the end of the rod 61 in front of the forward pillow block 60 is a tile following mechanism 116. In order that the tile following mechanism 116 may be secured to the rod 61 in a variety of positions, depending on the size of the tile 11 to be perforated, the tile following mechanism 116 has a T-shaped rod mount 118 with a cylindrical base 119 transversely mounting a rectangular brace 120. A rod receiving bore 121 extends axially through the base 119 and through the brace 120. By insertion of a mounting pin (not shown) through a mounting bore 122 transverse to the receiving bore 121 and through the receptacles 85 of the rod 61, the selective positioning of the tile following mechanism 116 upon the rod 61 can be obtained.

Secured by screws or the like to the brace 120 are a pair of opposing bearing ways 126 and 126'. Opposing sidewalls 127 and 127' likewise secured to the sides bearing ways 126 and 126' and brace 120 provide additional support therefor. The bearing ways 126 and 126' have opposing flat faces 128 the portions of which contiguous to the rod mount 118 define a horizontal bearing race 129. Opposing vertical bearing races 130 are also formed in the bearing ways 126 and 126' by rectangular, facing grooves formed therein. Disposed frontally within the way 126' and exiting from one side thereof is a horizontal air supply port 132 having at the central terminus thereof a vertically downward exiting passageway 134.

Disposed between the bearing ways 126 and 126' for reciprocating motion therebetween is a carriage 136. The carriage 136 has a rectangular body 138 with a central bore 140 passing therethrough. A pair of vertically orientated first roller bearings 142 are disposed at either end of the carriage 136 and lie within the horizontal bearing race 129 to rollably guide and support the reciprocating motion of the carriage 136. Orthogonal to the first roller bearings 142 are two pairs of opposing second roller bearings 144 which are likewise secured to the carriage body 138. Each pair of the second roller bearings 44 lie within one of the vertical bearing races 130 to further rollably guide and support the movement of the carriage 136.

From the foregoing it follows the carriage 136 may freely move from sidewall 127 to sidewall 127' without rocking in either the horizontal or vertical direction due to the disposition of the first and second roller bearings 142 and 144 within the aforementioned races.

Extending outward from the carriage 136 towards the tile 11 is a harpoon shaft 146. A stub end 148 is received by the central bore 140 of the carriage 136 and is secured therein as by a pin extending downward through the carriage body 138 to register with a receptacle 150 of the stub end 148. The remainder of the harpoon shaft 146 is somewhat larger in diameter than the stub end 148 and has at its end opposing the stub shaft 148 the slot 82 which receives and mounts, by fasteners 83, the previously described tile perforating harpoon head 75.

Secured to the harpoon shaft 146 is a tile following barrel 152 which preferably is made of a synthetic material such as nylon. The mounting of the barrel 152 to the harpoon shaft may be, for example, by the plug 77 and slot 78 arrangement as described in the previous embodiment of the perforator 20. As seen in FIGS. 6 and 7 the barrel 152 consists of a body 154 which has a generally cubical shape the top of which defines a top wall 155. Extending forwardly (i.e., toward the tile 11) from the body 154 is a cylindrical sleeve 158 having therein a cylinder 160. The cylinder 160, open towards the tile 11, extends somewhat into the body 154 to have a closed end. For purposes which hereinafter will become evident, a slot 162, elongated so as to maintain registry with the passageway 134 during the movement of the barrel 152, medially penetrates the top wall 155 of the body 154 and has an opening 160 to provide communication between the cylinder 160 and the slot 162.

Closely received within the cylinder 160 for axially sliding motion therein is a guide 166. The guide 166 is cylindrical having at one end the previously described finger 93 and, axially extending through the other end to stop short of the finger 93, a shaft receiving bore 168 which closely and slidably receives the harpoon shaft 146. The cut out 94 extends from the finger 93 substantially into the guide 166 to accommodate the harpoon head 75. As best seen in FIG. 7, rear shoulders 170 of the cut out 94 rest against the harpoon head 75 when the perforator is not engaging the tile 11 thereby maintaining the guide 166 within the cylinder 160.

From the foregoing the operation of this embodiment of the perforator 20 can be described. As seen in FIGS. 6 and 7 the perforator 20 is poised prior to extension thereof to engage the tile 11. The drive of the perforator 20, in the manner described above, causes the rod 61 and the attached tile following mechanism 116 to extend toward the tile 11 whereupon the finger 93 selectively finds a groove 12. Continuing the drive of the rod 61 toward the tile 11 causes the guide 166 to retract against the bias of compressed air introduced into the cylinder 160 through the air supply port 132, passageway 134, slot 162 and opening 164. Accompanying the retraction of the guide 166, the harpoon head 175 extends through the wall of the tile 11 creating a perforation therein. Subsequent retraction of the rod 61 pulls the tile following mechanism 116 away from the tile 11 and the harpoon head 75 from the tile 11. At such time as the harpoon head 75 is completely retracted from the tile 11 the bias of the compressed air within the cylinder 160 causes the guide 166 to move outward from the cylinder 160 accepting the harpoon head 75 within the cut out 94 until ultimately the shoulders 170 rest against the harpoon head 75. The foregoing is reciprocally repeated to perforate the tile 11 along its length.

In order for the perforator 20 to maintain the sustained engagement of the tile 11 required for the perforation thereof, the continuous advancement of the tile 11 results in following movement by the barrel 152 and the attached carriage 136. Accordingly, as shown in FIG. 6, the carriage 136 is maintained in the cocked, initial position by the holding of the attached body 154 against a stop 172 by the bias of a spring 174 which surrounds and is supported by an opposing spring support 176. Both the stop 172 and spring support 176 are secured respectively to the sidewalls 127 and 127'. The end of the spring 174 opposing the spring support 176 is supported by its reception into a cylindrical recess 178 in the body 154 of the barrel 152. As the perforator 20 extends and the tile 11 is engaged by the guide 166 and harpoon head 75, the continuous advancement of the tile 11 pulls the guide 166, barrel 152 and the attached carriage 136 along therewith against the bias of the spring 174. As stated above this following action is not accompanied by rocking or tilting of the barrel 152, not only because of the aforementioned disposition of the first and second roller bearings 142 and 144, but also due to the sliding of the body 154 upon the flat faces 128 of the bearing ways 126 and 126'.

Withdraw of the harpoon head 75 and the guide 166 from the tile 11 enables the bias of the spring 172 to forcibly return the barrel 152 and carriage 136 to the initial cocked position. It follows that repeated perforation of the tile 11 results in the reciprocating movement of the carriage 136 and barrel 152 as it follows the tile 11 and is returned by the spring 172.

From the foregoing the overall operation of the perforating unit 10 can be set forth. An appropriate tile 11 is selected and the size of the perforation desired is established. Accordingly the advance mechanism 21 is adjusted to advance the tile 11 through the unit 10, the harpoon mechanism 71 or tile following mechanism 116 is correctly positioned upon the end of the rod 61 and the proper harpoon head 75 is secured therein.

Starting the electric motor 22 simultaneously drive the advance mechanism 21 to pass the tile 11 through the unit 10 and all the perforators 20 to extend from their cocked position, move by either pivoting or rolling, to follow and perforate the tile 11, and return back to the cocked position for repeated perforation of the tile 11.

We claim:

1. A perforating device for manufacturing water drainage openings through the wall of flexible hollow drainage tile, comprising:
    a stationary frame having a support for a tile moving forwardly past the frame;
    a perforator carriage carried on the frame with a harpoon-like tile wall piercing member directed toward said tile portion moving past said frame;
    means interengaging said tile and carriage for allowing movement of the perforator carriage from an initial position forwardly along a path substantially parallel to forward movement of the tile during engagement of the piercing member with the tile so as to direct the piercing member to a single position on the tile;
    driving means for reciprocating the piercing member into and out of the tile while the perforator carriage is following the advancing tile; and
    means for biasing the perforator carriage rearwardly along the path to return the perforator carriage to the initial position immediately upon reciprocation of the piercing member out of the tile.

2. A perforating device as specified in claim 1 wherein a plurality of perforator carriages are provided on said frame with each having a piercing member radially directed relative to a cylindrical portion of the tile moving past said frame.

3. A perforating device as specified in claim 2 wherein said frame is annular with the tile advancing means located substantially in a central location relative to the frame and said perforator carriages all direct their respective piercing members radially toward a cylindrical tile portion moving past said frame.

4. A tile perforating device for forming openings in the wall of an advancing, hollow corrugated tile, the wall having alternating lands and grooves, comprising:
    a stationary frame;
    means for engaging said lands and grooves for advancing said tile through the frame;
    a perforator carried on said frame and having a tile piercing member directed from outside said tile toward said tile wall;
    means for mounting a portion of said perforator for movement in a linear path generally parallel to the tile in its advancing direction, said perforator portion being reciprocally movable in the path between an initial position and an end position;
    means for driving said tile piercing member radially toward and away from the tile wall, said driving means being operable during movement of said perforator portion between said initial and said end positions, said tile piercing member being retracted away from said tile as the perforator portion approaches said end position so that said perforator portion and reciprocating tile piercing member may return to said initial position while out of contact with said tile;

means associated with the movable perforator portion for engaging in said lands and grooves of said tile during movement in the path from said initial position to the end position providing synchronous movement of the movable perforator portion with the tile, said tile piercing member driving means being operable during the same synchronous movement of the perforator portion so as to perforate the tile at a single position during said tile piercing member reciprocation; and means for biasing the movable perforator portion toward said initial position for automatic return of the perforator portion and the piercing member to the initial position when out of engagement of the tile lands and grooves.

5. The tile perforating device described in claim 4 further comprising:

a piercing member enveloping guide shaped to be received by said tile grooves to guide said piercing member to perforate only within said grooves, said piercing member extending relative to said guide to perforate said tile;

means for biasing said guide to envelop said piercing member; and means for retracting said guide against said bias as the piercing member extends to perforate the tile.

6. A tile perforating device for perforating the wall of an advancing, corrugated tile, having alternating lands and grooves, comprising:

a frame;

means for advancing said tile through the frame;

a perforator mounted to the frame and having a piercing member;

means for driving the piercing member through a cycle including motion toward the tile for engagement with the tile and extension through the tile wall for perforation thereof and thereafter retraction of the member from said tile, said piercing member during each such cycle perforating said tile wall at a single position therealong;

a carriage mounting said piercing member;

means mounting the carriage to the perforator for reciprocal linear movement substantially parallel to movement of the advancing tile, said carriage following the advancing tile from an initial position wherein the member engages the tile to a terminal position wherein the member retracts from such engagement; and means for biasing the carriage to return to said initial position when said piercing member is retracted from the tile in preparation for repeated cycles.

7. A tile perforating device for advancing and perforating a corrugated tile having alternating lands and grooves, comprising:

a frame;

a pair of rotatable opposing wheels to engage said tile grooves and lands, said wheels rotating to advance said tile through the frame, said wheels being adjustable to advance different size tiles;

a tile perforating mechanism mounted on said frame and carrying a carriage;

means for reciprocally mounting the mechanism for radial movement with respect to the tile between a retraction position and an extended position;

means for mounting the carriage on the mechanism for reciprocal motion substantially perpendicular to the motion of the mechanism, the carriage motion being synchronous with the advancement of said tile when said mechanism engages said tile;

spring means for biasing the carriage against motion in the direction of the advancement of the file for subsequent return motion;

a harpoon interchangeably mounted on said carriage to perforate said tile when said tile perforating mechanism is moved to the extended position;

a guide to selectively direct said harpoon to perforate the grooves of said tile; and means for driving said wheels and for reciprocating and synchronously extending and retracting said tile perforating mechanism.

8. The tile perforating device described in claim 7 wherein said guide envelops said harpoon and has a finger to locate said grooves, and further comprising means for retracting said guide as said harpoon perforates the tile.

9. The tile perforating device as described in claim 8 wherein said guide is biased and retracts against said bias.

10. The tile perforating device as described in claim 7 wherein said drive means is a driven chain meashing with sprockets associated with said mechanism and said wheels.

11. The tile perforating device as described in claim 7 wherein said carriage has a plurality of roller bearings received by cooperating races in said tile perforating mechanism to provide for carriage movement.

12. The tile perforating device as described in claim 11 wherein said carriage moves from an initial position against a bias in following said tile, said bias returning said carriage to said initial position as the tile perforating mechanism is retracted from said tile.

13. The tile perforating device as described in claim 12 wherein said bias is a spring.

* * * * *